United States Patent Office.

JOHN HEROLD AND MERCER BROWN, OF FREDERICK, MARYLAND.

Letters Patent No. 78,372, dated May 26, 1868.

IMPROVED POLISH FOR LEATHER.

*The Schedule referred to in these Letters Patent and making part of the same.*

TO ALL WHOM IT MAY CONCERN:

Be it known that we, JOHN HEROLD and MERCER BROWN, of Frederick, in the county of Frederick, and in the State of Maryland, have invented new and useful Improvement in Leather-Polish; and do hereby declare that the following is a full, clear, and exact description thereof.

The nature of our invention consists in the mixture or compounding of the following-named ingredients, substantially in the manner hereafter described.

Venice turpentine, (2) two ounces; lamp-black, (1) one ounce; resin, (4) four ounces; gum-turpentine, (8) eight ounces; India rubber, (1) one ounce; neat's-foot oil, (4) four ounces; oil of lavender, ($1\frac{1}{2}$) one and one-half ounce; gum-shellac, (1) one pound; spirits of wine, (1) one gallon.

Powder the resin and shellac separately, dissolve the India rubber in the oil of lavender and neat's-foot oil. Dissolve the shellac in the alcohol, mix the resin and Venice turpentine with the mixture of neat's-foot oil, oil of lavender, and India rubber; then gradually mix in a mortar, the mixtures of shellac and alcohol, and resin, Venice turpentine, India rubber, oil of lavender, and neat's-foot oil, adding at the same time the lamp-black and gum-turpentine. Put the whole in a vessel, and allow the mixture to stand for three days; shake the same occasionally, and the mixture will be ready for use.

If heat be applied to dissolve the resins, gums, and India rubber, a water or sand-bath must be used.

The above-described mixture or compound makes a cheap and beautiful polish for any kind of leather, and may be applied in any convenient manner.

We do not desire to confine ourselves to any specific proportions of the above-named ingredients.

Having thus fully described our invention, what we claim as new, and desire to secure by Letters Patent, is—

The within-described mixture, when compounded and used substantially as and for the purpose herein set forth.

In testimony that we claim the foregoing, we have hereunto set our hands, this 1st day of April, 1868.

JOHN HEROLD,
MERCER BROWN.

Witnesses:
V. D. STOCKBRIDGE,
EDM. F. BROWN.